UNITED STATES PATENT OFFICE.

MAX ENGELMANN AND BENEDIKT MERKEL, OF ELBERFELD, GERMANY, ASSIGNORS TO SYNTHETIC PATENTS CO., INC., OF NEW YORK, N. Y., A CORPORATION OF NEW YORK.

PHARMACEUTICAL PRODUCT.

1,126,432.      Specification of Letters Patent.      Patented Jan. 26, 1915.

No Drawing.      Application filed April 8, 1914. Serial No. 830,386.

*To all whom it may concern:*

Be it known that we, MAX ENGELMANN and BENEDIKT MERKEL, chemists, citizens of the German Empire, residing at Elberfeld, Germany, have invented new and useful Improvements in Pharmaceutical Products, of which the following is a specification.

The present invention concerns the production of the hitherto unknown ethers of alpha-bromoisovalerylisourea having most probably the formula:

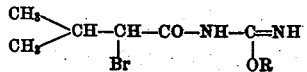

(R meaning an alkyl, such as —CH$_3$, —C$_2$H$_5$, —CH$_2$—C$_6$H$_5$,) which have proved to be valuable odorless sedatives. The process for their production consists in treating the ethers of isourea of the formula:

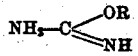

(R=alkyl or aralykl) or their salts with bromoisovaleryl haloids. The new products are oils soluble in alcohol, ether, benzene, and upon treatment with dilute hydrochloric acid they are converted into bromoisovaleryl urea.

In order to illustrate the new process more fully the following example is given, the parts being by weight:—90 parts of the methylethers of isourea (*Berichte der Deutschen Chemischen Gesellschaft* vol. 33 (1900) p. 810) are dissolved in 400 parts of ether and 140 parts of bromo-isovaleryl-bromid diluted with 400 parts of ether, are gradually added to the cooled solution. The mass of the reaction is then filtered and the ether is distilled. The methyl-ether of bromoisovalerylisourea having most probably the formula:

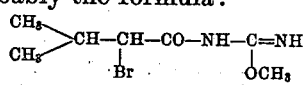

remains as an oil, soluble in ether, alcohol, benzene and diluted acids and difficultly soluble in cold water. This ether could not hitherto be obtained in a solid state. Upon treatment with dilute hydrochloric acid it is converted into the bromoisovalerylurea.

We claim:—

1. The new products being chemically ethers of alpha-bromoisovalerylisourea having most probably the following general formula:

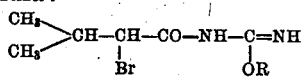

(R meaning an alkyl,), and being oils soluble in alcohol, ether and benzenes; being converted into bromoisovalerylurea upon treatment with dilute hydrochloric acid, substantially as described.

2. The new product being chemically the methylether of alpha-bromoisovalerylisourea having most probably the formula:

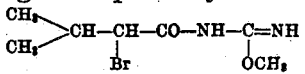

and being an oil soluble in ether, alcohol, benzene, dilute acids and being soluble with difficulty in cold water; being converted into bromoisovalerylurea upon treatment with dilute hydrochloric acid, substantially as described.

In testimony whereof we have hereunto set our hands in the presence of two subscribing witnesses.

MAX ENGELMANN. [L. S.]
BENEDIKT MERKEL. [L. S.]

Witnesses:
HELEN NUFER,
ALBERT NUFER.